(12) United States Patent
Baniameri et al.

(10) Patent No.: US 11,428,320 B2
(45) Date of Patent: Aug. 30, 2022

(54) SHUT-OFF DEVICE FOR SEALING A SHAFT OF A ROTARY MACHINE AND ROTARY MACHINE

(71) Applicant: Sulzer Management AG, Winterthur (CH)

(72) Inventors: Amir Baniameri, Gothenburg (SE); Erik Blechingberg, Gothenburg (SE)

(73) Assignee: SULZER MANAGEMENT AG, Winterthur (CH)

( * ) Notice: Subject to any disclaimer, the term of this patent is extended or adjusted under 35 U.S.C. 154(b) by 159 days.

(21) Appl. No.: 17/059,605

(22) PCT Filed: Aug. 7, 2019

(86) PCT No.: PCT/EP2019/071238
§ 371 (c)(1),
(2) Date: Nov. 30, 2020

(87) PCT Pub. No.: WO2020/035370
PCT Pub. Date: Feb. 20, 2020

(65) Prior Publication Data
US 2021/0254714 A1    Aug. 19, 2021

(30) Foreign Application Priority Data
Aug. 15, 2018  (EP) ..................... 18189153

(51) Int. Cl.
*F16J 15/00*    (2006.01)
*F16J 15/46*    (2006.01)

(52) U.S. Cl.
CPC ............. *F16J 15/008* (2013.01); *F16J 15/46* (2013.01)

(58) Field of Classification Search
CPC .... F16J 15/008; F16J 15/46; B63H 2023/327; B01F 2035/351
See application file for complete search history.

(56) References Cited

U.S. PATENT DOCUMENTS 2,720,011 A    10/1955 Krupp
2,797,972 A *  7/1957 Martin ..................... F16J 15/46
                                                 277/467

(Continued)

FOREIGN PATENT DOCUMENTS

DE    10 2016 204276 A1    9/2016
GB    2 218 162 A          11/1989

OTHER PUBLICATIONS

International Search Report and Written Opinion dated Oct. 22, 2019 in corresponding International Patent Application No. PCT/EP2019/071238, filed Aug. 7, 2019.

*Primary Examiner* — Nicholas L Foster
(74) *Attorney, Agent, or Firm* — Global IP Counselors, LLP

(57) ABSTRACT

A shut-off device includes a housing, a central passage extending in an axial direction to surround the shaft, a ring-shaped first disk, a ring-shaped second disk arranged in the housing and parallel with and spaced apart from the ring-shaped first disk in the axial direction, and an expandable annular seal having a first side wall, a second side wall and an elastic bottom, the first side wall and the second side wall each extending in a radial direction, and the bottom connecting a radially inner end of the first side wall with a radially inner end of the second side wall, and the housing includes an inlet for a fluid to expand the seal, the first side wall of the seal arranged and clamped between the housing and the first disk and the second side wall of the seal arranged and clamped between the housing and the second disk.

15 Claims, 8 Drawing Sheets

(56) References Cited

U.S. PATENT DOCUMENTS

| | | | | |
|---|---|---|---|---|
| 3,591,963 | A * | 7/1971 | Kopp | B64D 27/26 |
| | | | | 277/646 |
| 3,947,045 | A * | 3/1976 | Schmidt | F16J 15/38 |
| | | | | 277/391 |
| 4,189,158 | A * | 2/1980 | Roussin | F16J 15/46 |
| | | | | 277/389 |
| 4,923,074 | A * | 5/1990 | Johnston | B60J 10/244 |
| | | | | 220/232 |
| 5,377,216 | A | 12/1994 | Nilsen et al. | |
| 7,178,810 | B1 * | 2/2007 | Kuhary | F16J 15/061 |
| | | | | 277/921 |
| 2001/0020771 | A1 | 9/2001 | Nishikawa | |
| 2012/0306160 | A1 * | 12/2012 | Koch | F16J 15/3252 |
| | | | | 277/558 |
| 2016/0273659 | A1 * | 9/2016 | Delaby | F16C 33/782 |
| 2022/0018445 | A1 * | 1/2022 | Kung | F16J 15/3284 |

* cited by examiner

SHUT-OFF DEVICE FOR SEALING A SHAFT OF A ROTARY MACHINE AND ROTARY MACHINE

CROSS-REFERENCE TO RELATED APPLICATION

This application is a U.S. National Stage application of International Application No. PCT/EP2019/071238, filed Aug. 7, 2019, which claims priority to European Patent Application No. 18189153.2, filed Aug. 15, 2018, the contents of each of which are hereby incorporated herein by reference.

BACKGROUND

Field of the Invention

The invention relates to a shut-off device for sealing a shaft of a rotary machine. The invention further relates to a rotary machine comprising such a shut-off device.

Background Information

Conventional rotary machines for mixing, pumping, agitating or otherwise acting on one fluid or several fluids like for example agitators are used in many different industrial processes for mixing or agitating a process fluid, e.g. a liquid or a liquid containing solids.

In many applications the process fluid is contained in a tank or a tower or another vessel and the agitator is mounted to a wall or the bottom or the cover of the vessel. Amongst the wide range of industries where agitators are used is for example the pulp and paper industry. Here, agitators are used for example for dilution, mixing or bleaching processes.

Basically a rotary machine like an agitator comprises an impeller or propeller for acting on the fluid, a shaft which is connected at its one end to the impeller and at its other end to a drive unit for rotating the shaft with the impeller. The drive unit usually has a motor and a coupling for connecting the motor with the shaft, wherein the coupling comprises a belt drive or a gear box or any other suited transmission device.

Typically the drive unit is arranged outside of the vessel and at least a part of the shaft with the impeller is located inside the vessel for agitating the process fluid. There are known both top-mounted and side-mounted agitators. Top-mounted agitators are usually mounted to the cover or the top part of the tower or the vessel with the shaft of the agitator extending vertically. Side-mounted agitators are usually mounted to a side wall of the tower or the vessel with the shaft extending horizontally. Examples for both types of agitators are those which are sold by the applicant under the brands AGISTAR™, SALOMIX™ and SCABA™.

Especially regarding rotary machines mounted to a vessel, such as side-mounted or top-mounted pumps or agitators it is known to design the machine with a shut-off device for sealing the shaft of the rotary machine at standstill. The shut-off device is arranged to surround the shaft at a location between the impeller and the sealing unit for the shaft. Typically, the shut-off device is arranged inside the tank and at the location where the shaft passes through the wall of the vessel. The shut-off device can be fixed for example to the mounting flange, with which the machine is mounted to the wall of the vessel. The shut-off device has an activated state for sealing the shaft and a deactivated state for free rotation of the shaft within the shut-off device. During operation of the rotary machine, i.e. when the shaft is rotating, the shut-off device is in the deactivated state, so that the shaft can freely rotate without any contact with the shut-off device. A sealing unit, such as a stuffing box or a mechanical seal, seals the rotating shaft, so that the process fluid cannot leak along the shaft. At standstill of the rotary machine, i.e. when the shaft is not rotating, the shut-off device can be switched to the activated state, in which the shut-off device is in sealing contact with the shaft and prevents the process fluid from leaking along the shaft. Thus, it is possible, for example, to perform maintenance or service work at the sealing unit or to replace the sealing unit or parts thereof without emptying the vessel containing the process fluid. As a matter of course it is a great advantage to perform service or maintenance work without the need to discharge the process fluid from the vessel or the tank.

According to a known design the shut-off device comprises an expandable and elastic sealing element surrounding the shaft. The sealing element is ring-shaped and consists for example of a rubber. Comparable to a bicycle tube, the sealing element can be inflated or pressurized by a fluid, such as compressed air or water, in order to expand the sealing element such that it sealingly abuts the shaft.

In the deactivated state the sealing element is unexpanded and the shaft can rotate without any contact with the sealing element. To change to the activated state the fluid is supplied to the shut-off device and expands the ring-shaped sealing element such that the sealing element abuts the shaft along the entire circumference in a sealing manner. For switching from the activated to the deactivated state the fluid is discharged from the shut-off device and due to its elasticity the sealing member returns to its unexpanded state, so that the shaft can rotate without any contact with the sealing element.

SUMMARY

Starting from this state of the art it is an object of the invention to propose an improved shut-off device for sealing a shaft of a rotary machine at standstill. In addition, it is an object of the invention to propose a rotary machine having such an improved shut-off device.

The subject matter of the invention satisfying this object is characterized by the features described herein.

According to a first embodiment in accordance with the invention, a shut-off device for sealing a shaft of a rotary machine at standstill is proposed, the shut-off device having an activated state for sealing the shaft and a deactivated state for a free rotation of the shaft within the shut-off device, wherein the shut-off device comprises a housing, a central passage extending in an axial direction and adapted for surrounding the shaft, a ring-shaped first disk and a ring-shaped second disk arranged in the housing in parallel with each other and spaced apart from each other regarding the axial direction, an expandable annular sealing element having a first side wall, a second side wall and an elastic bottom, wherein the first side wall and the second side wall are each extending in a radial direction, and the bottom connects a radially inner end of the first side wall with a radially inner end of the second side wall, and wherein the housing comprises an inlet for a fluid for expanding the sealing element, wherein the first side wall of the sealing element is arranged and clamped between the housing and the first disk and the second side wall of the sealing element is arranged and clamped between the housing and the second disk.

For switching the shut-off device from the deactivated to the activated state a fluid, for example compressed air or water, is introduced through the inlet into the housing for pressurizing the sealing element. The pressure expands the sealing element by moving or deforming the elastic bottom of the sealing element radially inwardly towards the shaft until the sealing element sealingly abuts the shaft. For returning the shut-off device to the deactivated state the pressure in the housing is released by discharging the fluid. Due to its elasticity the bottom of the sealing element moves away from the shaft therewith opening the gap between the shaft and the sealing element.

Clamping the side walls of the sealing element between the housing and the first and second disk, respectively, has the considerable advantage that the sealing element expands only in one direction, namely in the radial direction, when the shut-off device is switched from the deactivated to the activated state. Thereby it is possible to design the radial distance between the shaft and the sealing element in the deactivated state considerably larger than in known devices.

Preferably, the sealing element is configured and arranged for preventing a relative movement of the side walls of the sealing element with respect to the housing in radial direction. Since the first and the second side wall of the sealing element are not sliding in radial direction along the housing there is no risk that the side walls of the sealing element are damaged by friction effects.

The increased gap between the shaft and the sealing element strongly increases the reliability and the lifetime of the shut-off device, because the increased gap reduces the risk that the shaft contacts or grinds along the sealing element, when the shaft is rotating and the shut-off device is in the deactivated state.

In addition, when a process fluid flowing through the gap between the shaft and the sealing element in the deactivated state contains particles or solid constituents the risk is considerably reduced, that such particles become trapped in the gap.

Furthermore, the larger gap between the shaft and the sealing element in the deactivated state ensures a better heat exchange in the area of the components adjacent to the shut-off device, for example a mechanical seal or a stuffing box.

In addition, when the shut-off device is arranged adjacent to a sealing unit for the rotating shaft, the large flowrate through the gap between the shaft and the sealing element in the deactivated state ensures better lubrication of the sealing unit.

It is a further advantage of the sealing element being clamped between the housing and the first and the second disk, respectively, that in the activated state the process fluid cannot leak in the radial direction, for example into the housing of the shut-off devices. Thus, the risk of an undesired leakage of the process fluid is considerably reduced. In addition, any solid particles contained in the process fluid cannot enter between the sealing element and the housing of the shut-off device. Thereby the risk that the sealing element will be damaged, in particular by such solid particles in the process fluid, is strongly reduced.

Although it is possible that only the bottom of the sealing element is elastic, it is preferred that the annular sealing element includes an elastomer. Preferably the entire sealing element is a single piece consisting of an elastomer, i.e. the bottom of the sealing element is formed integrally with the side walls of the sealing element.

According to a preferred embodiment the sealing element is bonded both to the first disk and to the second disk. Preferably, the entire first side wall of the sealing element is bonded to the first disk by an appropriate adhesive, and the second side wall of the sealing element is bonded to the second disk.

Regarding the first and the second disk it is preferred, that both the first disk and the second disk are metallic disks. For example, the first and the second disks are made of steel.

In order to provide a large radial gap between the shaft and the sealing element in the deactivated state it is a preferred measure, that the bottom of the annular sealing element has in the deactivated state a width being larger than the distance between the first side wall and the second side wall of the sealing element. Thus, in the deactivated state the bottom does not extend parallel to the axial direction but is curved or folded radially outwardly (with respect to the shaft) between the side walls of the sealing element. Thereby the bottom considerably increases the extension of the sealing element in the radial direction, when the shut-off device is switched in the activated state.

According to a preferred design, the bottom of the annular sealing element has in the deactivated state an essentially V-shaped cross-section. The bottom is arranged such that the open side of the V faces the central passage for receiving the shaft and the apex of the V faces away from the central passage.

According to a preferred embodiment a distance ring is arranged between the first disk and the second disk, the distance ring abutting both the first disk and the second disk. The distance ring stabilizes the relative position of the first and the second disk. Preferably the distance ring includes two separate half rings each of which is inserted between the first disk and the second disk.

Preferably, the distance ring comprises a plurality of holes arranged along the circumference of the distance ring for delivering the fluid to the sealing element. When the fluid is introduced into the housing of the shut-off-devices the fluid passes through the holes in the distance ring for pressurizing the sealing element.

According to a further preferred measure the shut-off device comprises an annular chamber surrounding the distance ring, wherein the annular chamber is in fluid communication with the inlet for the fluid.

The shut-off device can further comprise a supply unit for supplying the fluid, wherein the supply unit is arranged outside the housing and is in fluid communication with the inlet of the housing.

Preferably the supply unit is designed for selectively supplying the fluid to the housing and discharging the fluid from the housing. For that purpose the supply unit can comprise or can be connectable to a pump for sucking the fluid off the housing.

According to a second embodiment in accordance with the invention, a shut-off device for sealing a shaft of a rotary machine at standstill is proposed, the shut-off device having an activated state for sealing the shaft and a deactivated state for a free rotation of the shaft within the shut-off device, wherein the shut-off device comprises a housing, a central passage extending in an axial direction and adapted for surrounding the shaft, and at least two sealing parts, namely a first sealing part and a last sealing part. Each sealing part comprises a ring-shaped first disk and a ring-shaped second disk arranged in the housing in parallel with each other and spaced apart from each other regarding the axial direction, and an expandable annular sealing element having a first side wall, a second side wall and an elastic bottom. Each first side wall and each second side wall are extending in a radial direction, and each bottom connects a radially inner end of the first side wall with a radially inner end of the second side wall of the same sealing part. The housing comprises an inlet for a fluid for expanding each sealing element. The first side wall of the sealing element of the first sealing part is arranged and clamped between the housing and the first disk of the first sealing part, and the second side wall of the sealing element of the last sealing part is arranged and clamped between the housing and the second disk of the last sealing part.

According to this second embodiment there are at least two sealing parts provided in the housing each of which comprises the sealing element, as well as the first disk and the second disk as it has been described hereinbefore. Thus, according to the second embodiment there are two sealing parts in the housing, whereas the first embodiment comprises only one sealing part with the sealing element and the first and the second disk. All explanations with respect to the first embodiment are also valid in the same manner or in an analogous manner for the second embodiment. In particular, each of the two sealing parts of the second embodiment can optionally comprise a distance ring and a plurality of holes in the distance ring.

Preferably, the first sealing part and the second sealing part are configured in the same manner. The two sealing parts are arranged in series, i.e. adjacent to each other with respect to axial direction, such that the second side wall of the sealing element of the first sealing part abuts against the first side wall of the sealing element of the adjacent sealing part.

In an analogous manner as in the first embodiment, clamping the first side wall of the sealing element of the first sealing part and the second side wall of the sealing element of the second sealing part between the housing and the respective first or second disk, has the considerable advantage that both sealing elements expand only in one direction, namely in the radial direction, when the shut-off device is switch from the deactivated to the activated state.

Preferably, each sealing element is configured and arranged for preventing relative movement of the side wall of the respective sealing element with respect to the housing in radial direction. Since the first side wall of the sealing element of the first sealing part and the second side wall of the sealing element of the last sealing part are not sliding in radial direction along the housing there is no risk that the side walls of the sealing elements are damaged by friction effects.

In addition, according to the invention a rotary machine for acting on a process fluid is proposed, comprising an impeller for acting on the process fluid, a shaft, on which the impeller is mounted, a drive unit operatively connected to the shaft for rotating the shaft and the impeller, and a sealing unit for sealing the shaft during rotation of the shaft, wherein the rotary machine comprises a shut-off device designed according to the invention and arranged adjacent to the sealing unit.

According to a preferred embodiment the rotary machine is designed as an agitator for mixing or agitating a process fluid.

Preferably the agitator has a mounting flange for fastening the rotary machine to a wall of a vessel for the process fluid, wherein the shut-off device is fixed to the mounting flange. The shut-off device is fixed on that side of the mounting flange, which faces the vessel. After the agitator has been mounted to the wall of the vessel, the shut-off device is located within the vessel.

It is preferred that the sealing unit is integrated in the mounting flange. Thereby the sealing unit is arranged directly adjacent to the shut-off device.

The agitator can be designed as a side-mounted or a top-mounted agitator for being mounted horizontally or vertically to a wall of a vessel for the process fluid. However, the agitator can also be designed for other types of mounting it to a vessel, a tower, a tank or the like.

The rotary machine according to embodiments of the invention can also be designed for example as a pump or as a dynamic mixer.

Further advantageous measures and embodiments of the invention will become apparent from the dependent claims.

BRIEF DESCRIPTION OF THE DRAWINGS

The invention will be explained in more detail hereinafter with reference to the drawings.

DETAILED DESCRIPTION

In the following description of the invention reference is made by way of example to a rotary machine designed as an agitator for mixing or agitating a process fluid. Although this is in practice an important embodiment of a rotary machine according to the invention, it has to be understood that the invention is not restricted to such embodiments as an agitator. The rotary machine according to the invention can also be designed as any other type of a rotary machine for mixing, pumping, agitating or otherwise acting on process fluids. Preferably the rotary machine is intended to be mounted to a wall of a vessel. In particular, the rotary machine can also be a pump.

Figure 1:
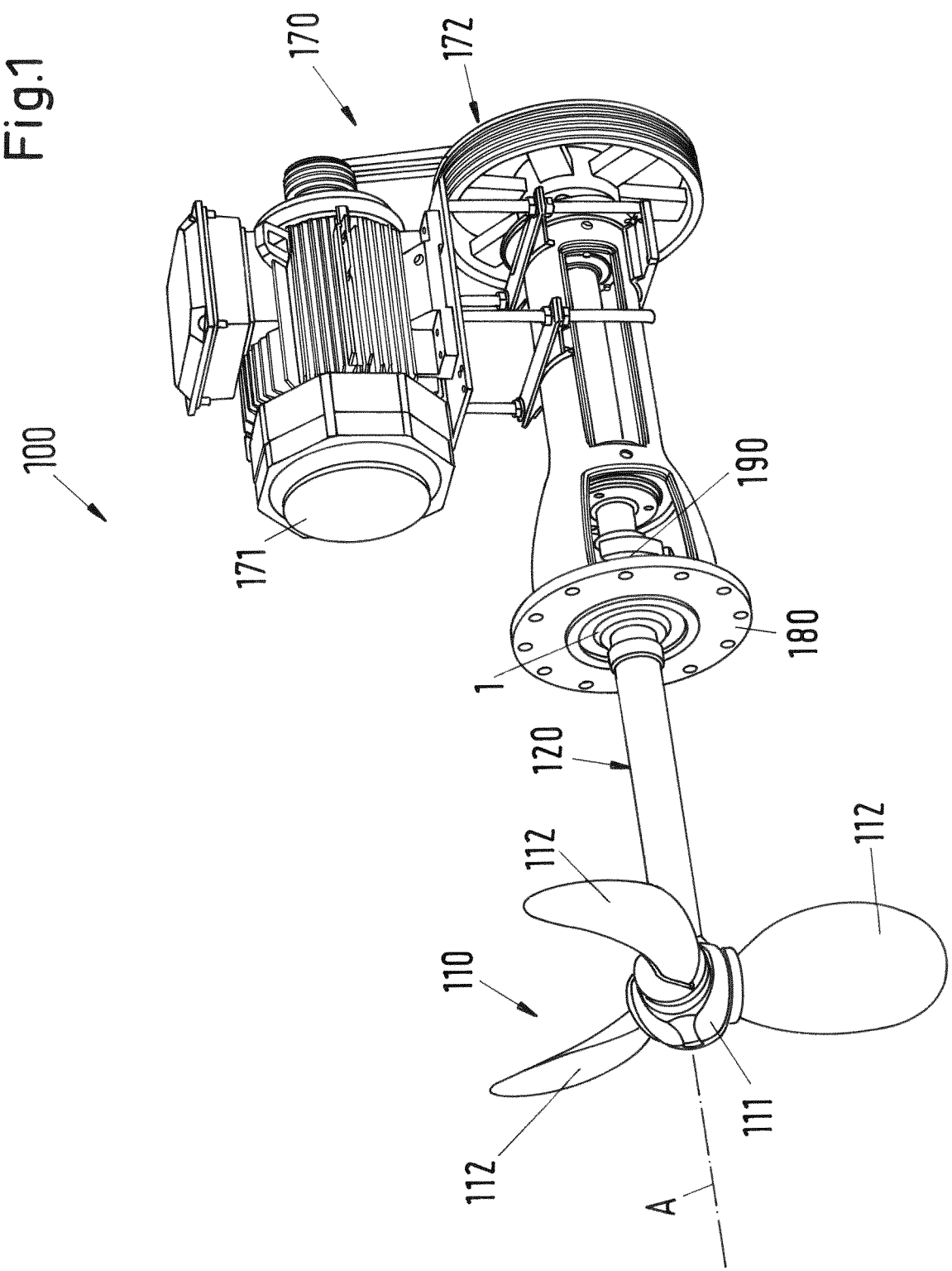
FIG. 1 is a perspective view of an embodiment of a rotary machine according to an embodiment of the invention designed as an agitator.

For the sake of a better understanding, firstly the general setup of an agitator will be explained referring to FIG. 1. FIG. 1 shows a perspective view of an embodiment of a rotary machine according to the invention and designed as an agitator for mixing or agitating a process fluid in a vessel or a tank or the like. The agitator is designated in its entirety with reference numeral 100. The agitator comprises an impeller 110 for acting on a process fluid in a vessel (not shown). The impeller comprises a hub 111 and three blades 112 mounted to the hub 111 for acting on the process fluid.

The hub 111 of the impeller 110 is connected in a torque-proof manner to an end of a shaft 120. The other end of the shaft 120 is operatively connected to a drive unit 170 for rotating the shaft 120 and the impeller 110 around an axis of rotation. The axis defines an axial direction A. A direction perpendicular to the axial direction A is referred to as a radial direction. The drive unit 170 comprises a motor 171, for example an electric motor 171, and a coupling 172 for operatively connecting the motor 171 with the shaft 120.

The coupling 172 shown in FIG. 1 has a belt drive for connecting the motor 171 to the drive shaft 120. It goes without saying that the invention is not restricted to such a belt drive. The drive unit 170 of an agitator 100 according to the invention can also be designed with any other coupling 172 between the motor 171 and the drive shaft 120 known in the art, for example with a gear box or any other suited transmission device. In addition, the relative arrangement of the motor 171, the coupling 172 and the drive shaft 120 shown in FIG. 1 shall be understood exemplary. There are many other arrangements known in the art that are also suited for an agitator or a rotary machine according to the invention.

The embodiment of the agitator 100 shown in FIG. 1 is designed as a side-mounted agitator. The agitator 100 is designed for being mounted horizontally to a wall of a vessel, a tank, a tower, a container or any other receptacle, i.e. the shaft 120 is extending horizontally in the usual orientation of use of the agitator 100. Although this is one preferred embodiment for the agitator 100, the invention is not restricted to side-mounted or horizontal agitators or rotary machines. The agitator 100 can also be designed for example as a top-mounted or vertical agitator, i.e. with the shaft extending vertically in the usual orientation of use. Furthermore, it is also possible that the agitator 100 is designed for an oblique mounting to the wall of a vessel, i.e. the axial direction A or the shaft 120, respectively, of the mounted agitator includes an angle with the horizontal direction that is different from zero degree and different from 90 degree.

The side-mounted agitator 100 shown in FIG. 1 has a mounting flange 180 for fastening the agitator 100 to a wall of a vessel, tank, tower or the like (not shown in FIG. 1). The mounting flange 180 surrounds the shaft 120 concentrically and comprises several bores for receiving screws or bolts for fastening the agitator 100 to the wall. When the agitator 100 is mounted to the wall, the impeller 110 and the part of the shaft 120 between the mounting flange 180 and the impeller 110 are located within the vessel, the tank, the tower or the like containing the process fluid to be agitated or mixed by the impeller 110. For sealing the rotating shaft 120 passing through the wall of the vessel, the agitator 100 further comprises a sealing unit or device (seal) 190, which is incorporated into the mounting flange 180. The sealing unit 190 can be designed as a stuffing box or as a mechanical seal or as any other sealing unit for the sealing of a rotating shaft 120. Further details of the agitator 100 such as bearings are well known to the skilled person and therefore will not be described in more detail.

The agitator 100 further comprises a shut-off device 1 for sealing the shaft 120 at standstill, i.e. when the shaft 120 is not rotating. The shut-off device 1, which will be described in more detail hereinafter, is arranged adjacent to the sealing unit 190. In the embodiment of the agitator 100 shown in FIG. 1 the shut-off device 1 is fixed to the mounting flange 180 (see also FIG. 4). More precisely, the shut-off device 1 is fixed to the side of the flange 180, which faces the impeller 110, so that the shut-off device 1 is arranged between the sealing unit 190 and the impeller 110. When the agitator 100 is mounted to the wall of a vessel, the shut-off device 1 is located within the vessel.

The shut-off device 1 is designed and arranged to surround the shaft 120. The shut-off device 1 has an activated state and a deactivated state. In the activated state the shut-off device 1 seals the shaft 120, so that the process fluid cannot leak along the shaft 120 through the shut-off device 1. In the deactivated state the shaft 120 can freely, i.e. contactlessly, rotate within the shut-off device 1. During rotation of the shaft 120 the shut-off device 1 is in the deactivated state and the process fluid can flow in axial direction A through the shut-off device 1. The shaft 120 is sealed by the sealing unit 190. At standstill, i.e. when the shaft 120 is not rotating, the shut-off device 1 can be switched to the activated state for sealing the shaft 120, so that the process fluid can no longer pass along the shaft 120 through the shut-off device 1. Since the shaft 120 is now sealed by the shut-off device 1, it is possible to replace or to perform maintenance work on the seal unit 190 without emptying the vessel. Thus, the process fluid can remain within the vessel during overhaul of the seal unit 190 or of other components located outside the vessel.

Referring to FIG. 2-8, a first embodiment of the shut-off device 1 according to the invention will now be explained in more detail.

Figure 2:
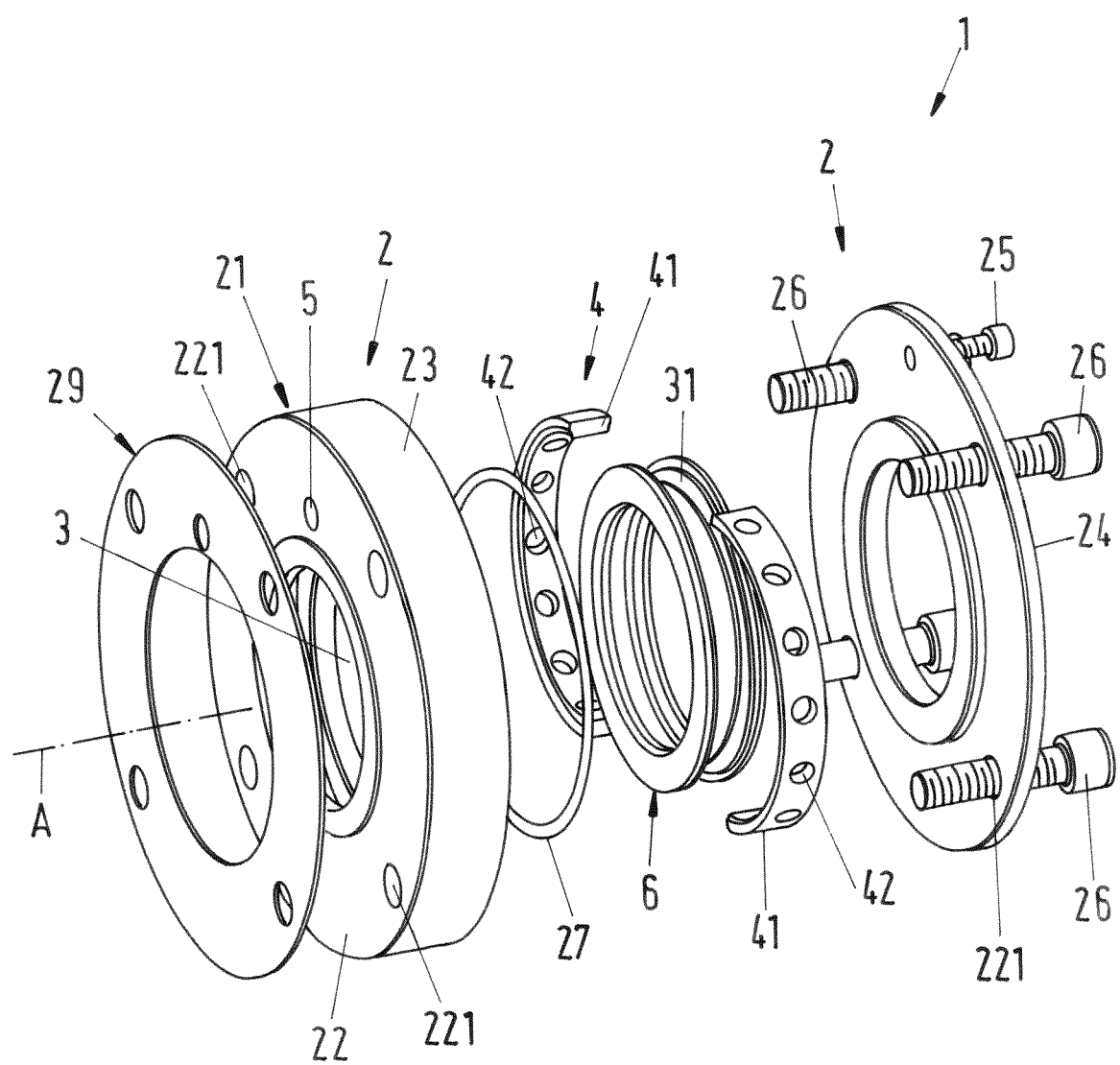
FIG. 2 is an exploded view of a first embodiment of a shut-off device according an embodiment of to the invention.
Figure 3:
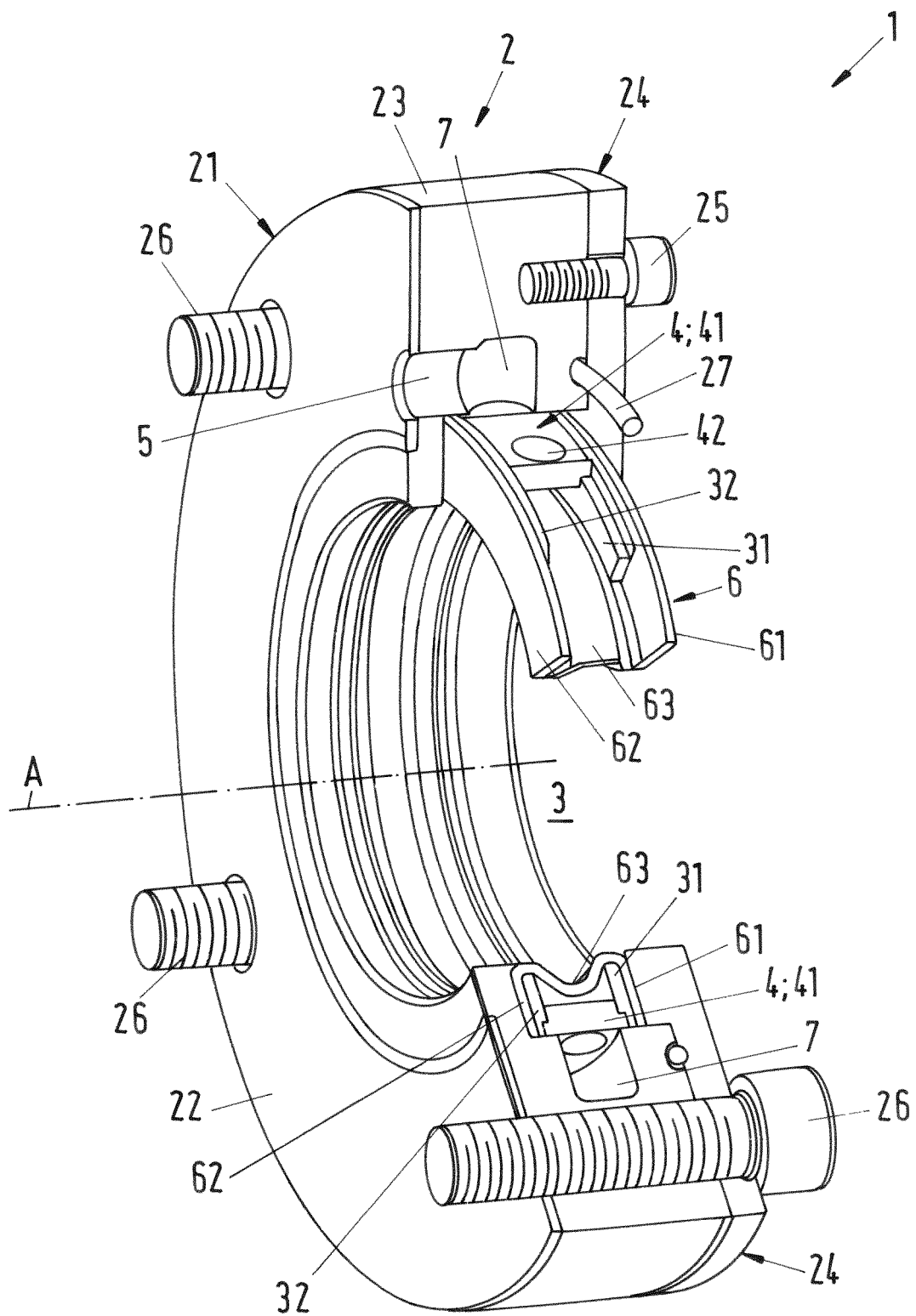
FIG. 3 is a perspective sectional view of the embodiment shown in FIG. 2 in the assembled state.
Figure 4:
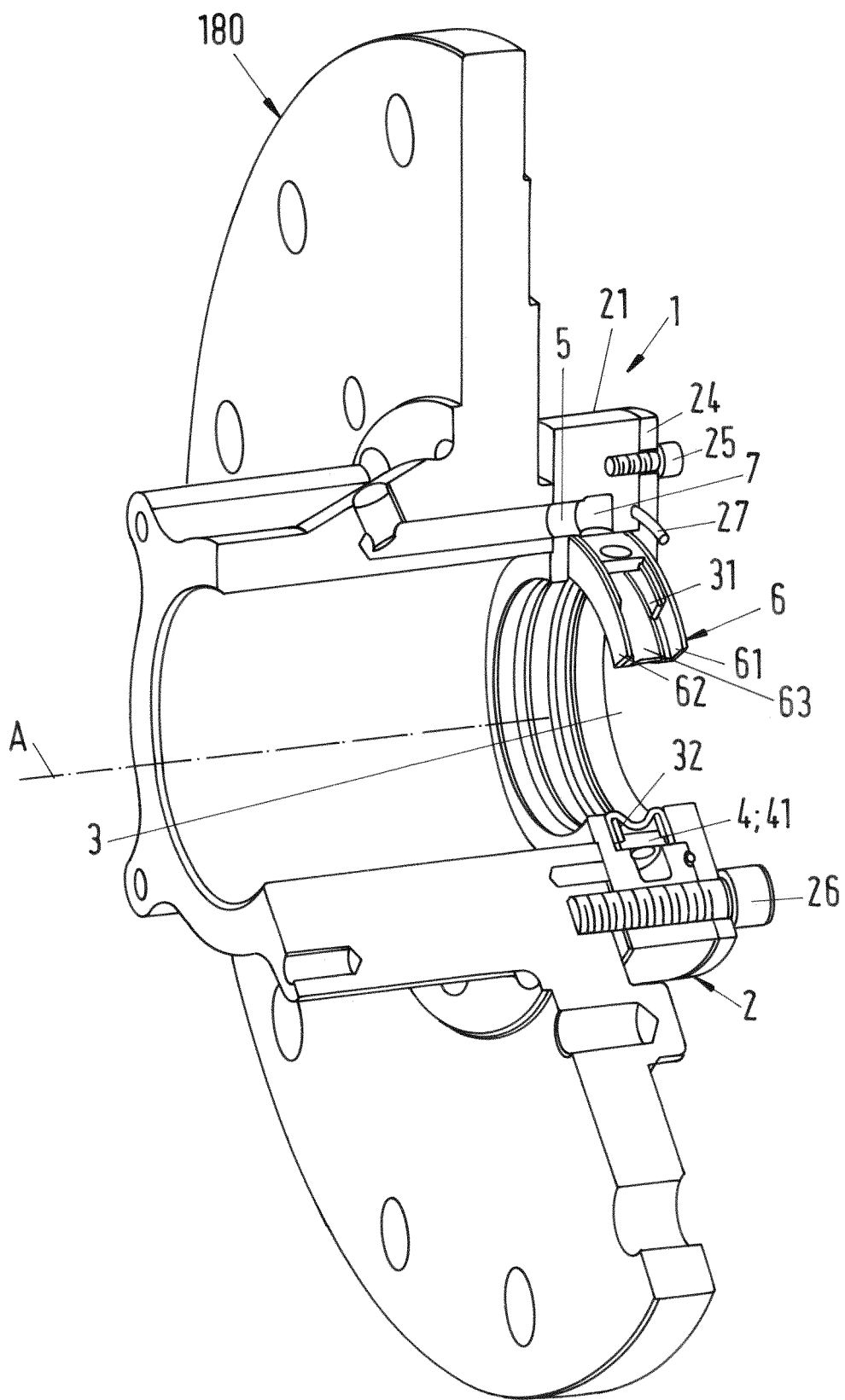
FIG. 4 is a perspective sectional view of the embodiment shown in FIG. 2, fixed to the mounting flange of the agitator shown in FIG. 1.
Figure 5:
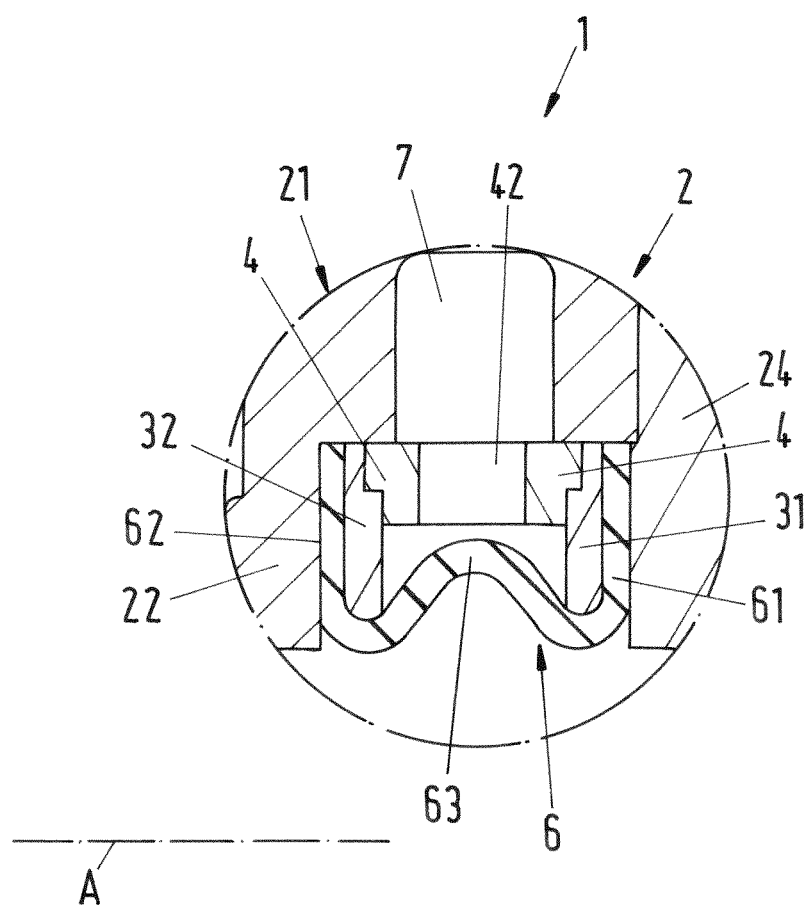
FIG. 5 is a detailed view of the embodiment of the shut-off device in a cross-sectional view in an axial section.

FIG. 2 shows an exploded view of the first embodiment of the shut-off device 1 according to the invention. FIG. 3 shows a perspective sectional view of the shut-off device 1 in the assembled state and FIG. 4 shows the assembled shut-off device 1 of FIG. 3 fixed to the mounting flange 180 of the agitator 100 shown in FIG. 1. FIG. 5 shows a detail of the shut-off device 1 in an enlarged cross-sectional representation along a section plane containing the axial direction A, i.e. FIG. 5 is an axial section.

The shut-off device 1 comprises a housing 2 having a generally cylindrical or annular design with a central passage 3 extending in the axial direction A through the housing 2. The central passage 3 is adapted for receiving the shaft 120, so that the shut-off device 1 surrounds the shaft 120.

The housing 2 comprises an annular housing part 21 forming a bottom 22 as well as a cylindrical side wall 23 of the housing 2. The housing 2 further comprises a cover 24, which can be fixed to the housing part 21 by a plurality of first screws 25 to close the housing 2 with respect to the axial direction A. The first screws 25 are arranged for engaging with the side wall 23 of the housing part 21.

Both the cover 24 and the bottom 22 of the housing part 21 comprise a plurality of holes 221 for receiving second screws 26, by which the housing 2 can be fixed to the mounting flange 180 of the agitator 100 (FIG. 4). In this embodiment of the shut-off device 1 there are provided four second screws 26, each of which extends through the cover 24 and through the bottom 22. By the second screws 26 the cover 24 can be clamped and pressed against the housing part 21 and the shut-off device 1 can be securely fixed to the flange 180.

The primary function of the first screws 25, here two first screws 25, is to keep the cover 24 and the housing part 21 together for closing the housing 2, so that the entire housing 2 forms one unit. By the first screws 25 the entire shut-off device 1 can be preassembled. Thus, it is possible to ship the closed shut-off device to the location where the shut-off device 1 is installed. The shut-off device can then be mounted, for example to the mounting flange 180, without reopening the shut-off device 1. After the shut-off device 1 has been fixed to the mounting flange 180 by the second screws 26 the first screws 25 are no longer needed and might even be removed.

Preferably, a sealing ring 27, for example an O-ring 27, is arranged between the housing part 21 and the cover 24 of the housing 2. The sealing ring 27 can be arranged in an annular groove disposed in the cover 24 or in the side wall 23 of the housing. The sealing ring 27 supports the sealing between the cover 24 and the housing part 21, so that the process fluid cannot enter the shut-off device 1 between the cover 24 and the side wall 23 of the housing 2. In addition, when the shut-off device is in the activated state the sealing ring 27 prevents a fluid used for activating the shut-off device 1 from leaking to the outside of the housing 2.

Furthermore, an annular seal 29, for example a gasket or a flat gasket 29, can be arranged at the outside of the bottom 22 of the housing 2 (FIG. 2). In the mounted state of the shut-off device 1 the annular seal 29 is arranged and clamped between the bottom 22 of the housing 2 and the mounting flange 180 (or any other part to which the shut-off device 1 is fixed). The annular seal 29 helps both to prevent the process fluid from entering the shut-off device 1 and to seal the shut-off-device against a leakage of the fluid used for activating the shut-off device 1 when the shut-off device 1 is in the activated state.

The housing 2 further comprises an inlet 5 for introducing the fluid for activating the shut-off device 1 into the housing 2 or for discharging the fluid from the housing 2. The fluid is used to switch the shut-off device 1 from the deactivated state into the activated state as will be explained hereinafter. The inlet 5 is arranged in the bottom 22 of the housing part 21.

Within the housing 2 a ring-shaped first disk 31 and a ring-shaped second disk 31 (FIG. 3) are arranged to respectively surround the central passage 3. The first and the second disk 31, 32 are stable in shape and preferably made of a metallic material, for example a steel. The first disk 31 and the second disk 32 are arranged in parallel with each other and spaced apart from each other with respect to the axial direction A.

The described embodiment of the shut-off device 1 further comprises a distance ring 4 being arranged between the first disk 31 and the second disk 32 with respect to the axial direction A. The distance ring 4 abuts both the first disk 31 and the second disk 32 in order to fix the axial distance between the first disk 31 and the second disk 32. The distance ring 4 comprises two separate half rings 41, each of which is inserted between the first disk 31 and the second disk 32, so that the distance ring 4 is arranged between the first disk 31 and the second disk 32. In the assembled state (see for example FIG. 3), i.e. when the cover 24 is firmly fixed to the housing part 21, the distance ring 4 is clamped between the first disk 31 and the second disk 32.

The distance ring 4 comprises a plurality of holes 42 arranged along the circumference of the distance ring 4, so that the fluid introduced into or discharged from the housing 2 can pass through the distance ring 4 in radial direction. Preferably the holes 42 are distributed equidistantly along the circumference of the distance ring 4.

The shut-off device 1 further comprises an annular chamber 7 surrounding the distance ring 4. The annular chamber 7 is in fluid communication with the inlet 5 for the fluid. More precisely, the inlet 5 opens into the annular chamber 7. The annular chamber 7 is radially outwardly delimited by the side wall 23 of the housing. Radially inwardly the annular chamber 7 is delimited by the distance ring 4, wherein the holes 42 in the distance ring 4 allow for a flow of the fluid through the distance ring 4.

The shut-off device 1 further comprises a sealing element 6 for sealingly abut the shaft 120, when the shut-off device 1 is in the activated state. For a better understanding FIG. 6 additionally shows a cross-sectional view of the sealing element 6 and the first and the second disk 31, 32 in a section in axial direction A. FIG. 7 shows a detail C of FIG. 6 in an enlarged representation. Each of FIG. 2-7 shows the sealing element 6 in the deactivated state of the shut-off device. FIG. 8 shows a schematic cross-sectional view of the shut-off device 1 in the activated state, in which the sealing element 6 is in sealing contact with the shaft 120.

The sealing element 6 has a generally annular shape for surrounding the shaft 120 and is designed to be expandable in radial direction. As can be best seen in FIG. 6 and FIG. 7, the sealing element 6 has a first side wall 61, a second side wall 62 and an elastic bottom 63 connecting the first and the second side wall 61, 62. Both the first side wall 61 and the second side wall 62 are each extending in radial direction and the elastic bottom 63 connects the radially inner end of the first side wall 61 with the radially inner end of the second side wall 62.

As can be seen for example in FIG. 3 and FIG. 5, the first side wall 61 of the sealing element 6 is arranged between the first disk 31 and the housing 2, more precisely the cover 24 of the housing 2, and the second side wall 62 of the sealing element 6 is arranged between the second disk 32 and the housing 2, more precisely the bottom 22 of the housing 2. Furthermore, the sealing element 6 is arranged such, that the first side wall 61 of the sealing element 6 is clamped between the first disk 31 and the housing 2 and the second side wall 62 of the sealing element 6 is clamped between the second disk 32 and the housing 2, when the cover 24 is fixed to the housing part 21 by the second screws 26.

As can be seen in FIG. 7 the disks 31, 32 and the side walls 61, 62 of the sealing element 6 are dimensioned such, that both the first side wall 61 and the second side wall 62 of the sealing element 6 are clamped between the respective first or second disk 31 or 32 and the housing 2 over the entire extension of the respective side wall 61, 62 in radial direction. Thus, in the assembled state of the shut-off device 1 the entire respective first or second side wall 61, 62 of the sealing element 6 is clamped between the housing 2 and the respective first or second disk 31, 32. This is a measure to avoid a relative movement of the side walls 61, 62 of the sealing element 6 with respect to the housing 2 in radial direction.

Preferably, the sealing element 6 is designed as a one-piece part, i.e. the bottom 63 and the side walls 61, 62 of the sealing element 6 are integrally formed as a single part. Most preferred the sealing element 6 consists of an elastomer, so that the sealing element 6 is elastically expandable in radial direction.

Since the first side wall 61 and the second side wall 62 of the sealing element 6 are entirely clamped so that they cannot move relative to the housing a grinding or a frictional movement between the side walls 61, 62 made of the elastomer and the housing 2, which is preferably made of a metallic material, is reliably prevented.

The elastomer, of which the sealing element includes, is for example a rubber such as EPDM rubber (EPDM: ethylene propylene diene monomer) or natural rubber, or a silicone, or fluorosilcone, or neoprene, or a fluoropolymer elastomer, e.g. the one which is commercially available under the tradename Viton.

Basically it is sufficient, when the sealing element 6 is firmly clamped between the housing 2 and the first disk 31 or the second disk 32, respectively. However, it is preferred, that the first disk 31, the second disk 32 and the sealing element 6 are designed as a rubber-metal compound, i.e. the first disk 31, the second disk 32 and the sealing element 6 are configured as a rubber-bonded-to metal component. For that purpose (see FIG. 7) the metallic first disk 31 is bonded to the first side wall 61 of the sealing element 6 and the metallic second disk 32 is bonded to the second side wall 62 of the sealing element 6. The bonding can be realized by any adhesive that is suited to bond a metal to a rubber.

The metallic first and second disk 31, 32 are arranged—with respect to the axial direction A—at the inside of the sealing element 6 (FIG. 7), such that the first disk 31 faces the second disk 32 and the first side wall 61 as well as the second side wall 62 of the sealing element 6 are arranged at the outside of the first and the second disk 31, 32.

In order to provide a large radial gap between the shaft 120 and the sealing element 6 in the deactivated state of the shut-off device 1 it is preferred, that the bottom 63 of the annular sealing element 6 has also in the deactivated state, when the sealing element 6 is not expanded, a width being larger than the distance D (FIG. 7) between the first side wall 61 and the second side wall 62 of the sealing element 6.

The distance D between the first and the second side wall 61, 62 designates the distance measured in the axial direction A. The width of the bottom 63 designates the extension of the bottom 63 as measured between the first and the second side wall 61, 62 along the profile of the bottom 63 in a cross-section perpendicular to the circumferential direction.

Since the width is larger than the distance D, the bottom 63 of the sealing element 6 does not extend parallel to the axial direction A in the deactivated state but is curved or folded radially outwardly (with respect to the shaft 120 or the central passage 3) between the side walls 61, 62 of the sealing element 6. Thereby the bottom 63 considerably increases the extension of the sealing element 6 in the radial direction, when the shut-off device 1 is switched to the activated state (FIG. 8).

Figure 6:
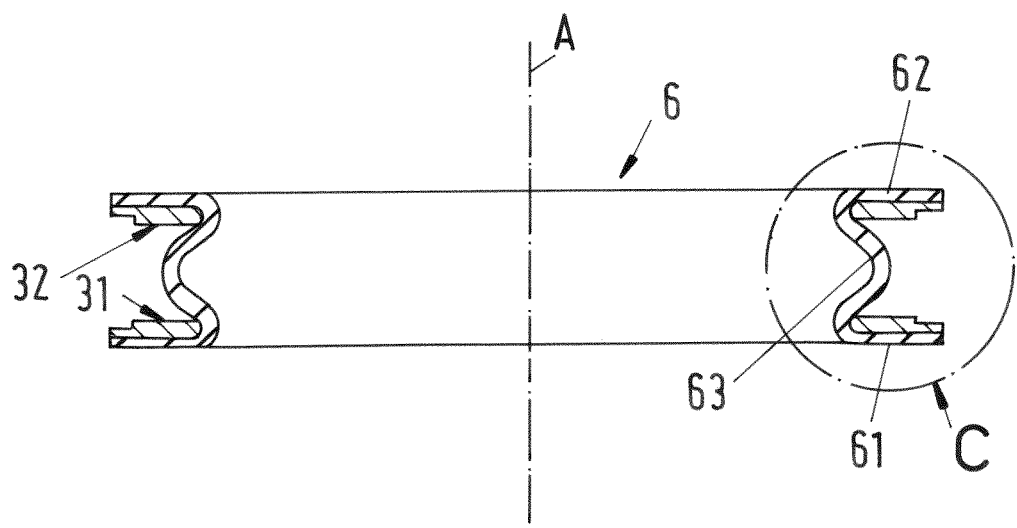
FIG. 6 is a cross-sectional view of the sealing element and the two disks in a section in axial direction.
Figure 7:
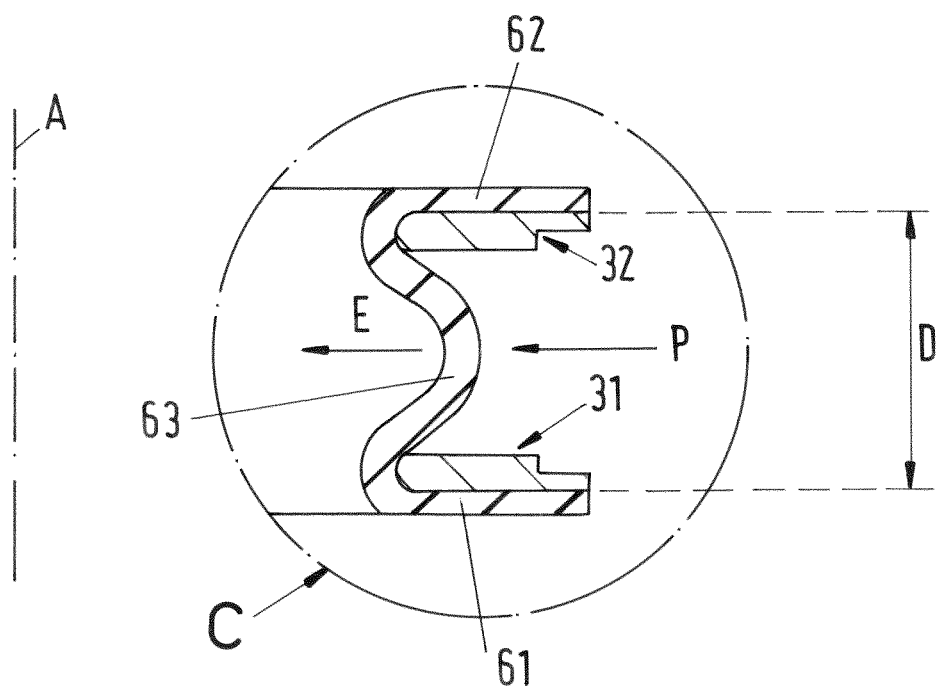
FIG. 7 is an enlarged detailed view C of FIG. 6.
Figure 8:
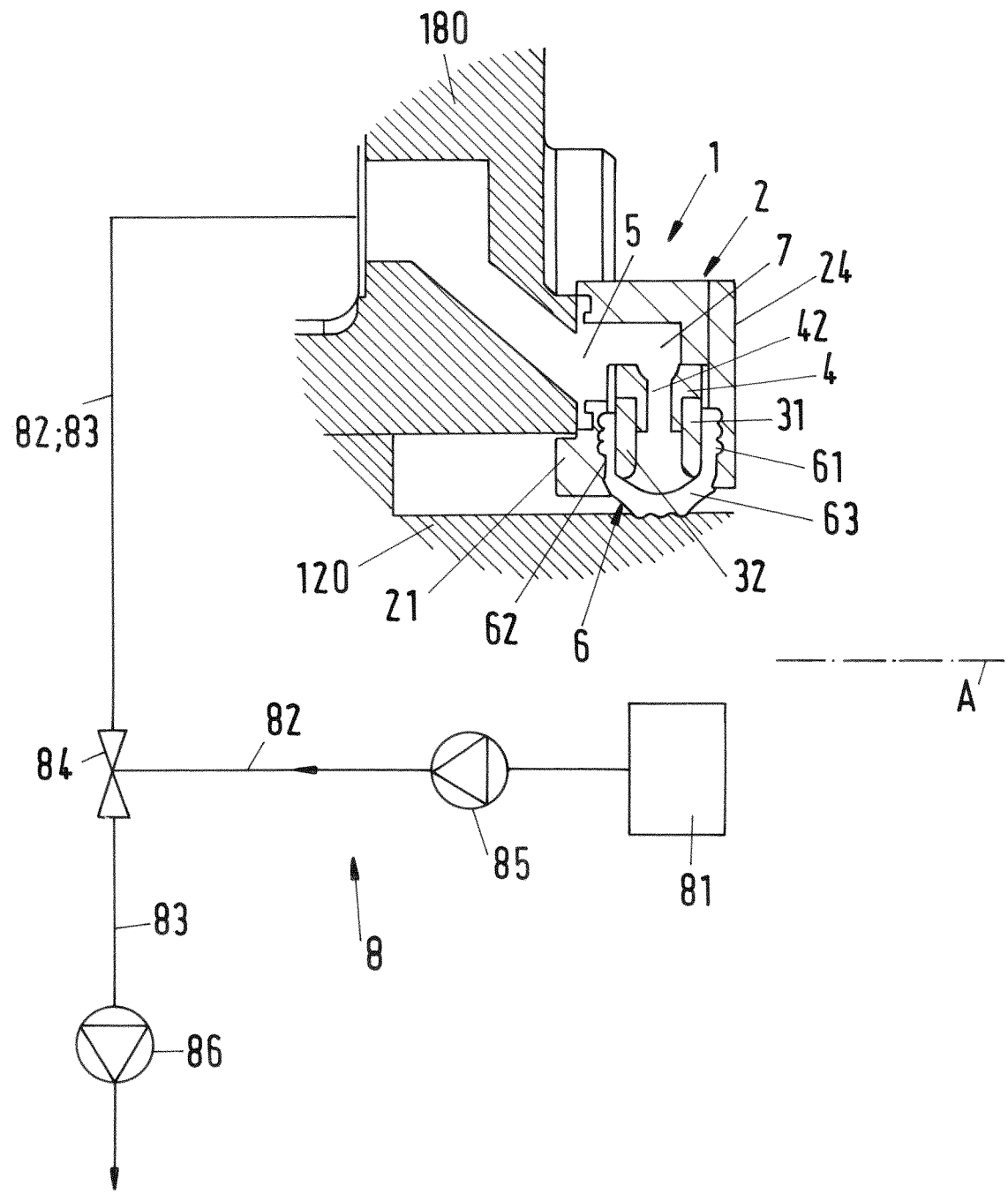
FIG. 8 is a schematic cross-sectional view of the embodiment of the shut-off device in the activated state.

According to a preferred design and as it is shown for example in FIG. 5-7, the bottom 63 of the annular sealing element 6 has in the deactivated state an essentially V-shaped or U-shaped profile in a cross-section perpendicular to the circumferential direction of the sealing element 6. The bottom 63 is arranged such that the open side of the V faces the central passage 3 and the apex of the V faces away from the central passage 3. This means, that the bottom 63 of the sealing element 6 is bended or curved into the space between the two side walls 61 and 62, when the shut-off device 1 is in the deactivated state.

Even though the embodiment with the V-shaped or U-shaped profile of the bottom 63 in the deactivated state is a preferred design, it has to be noted, that in other embodiments the bottom 63 of the sealing element 6 can have a straight profile in a cross-section perpendicular to the circumferential direction, when the shut-off device 1 is in the deactivated state. In such embodiments the ring-shaped bottom 63 of the sealing element extends parallel to the shaft, meaning in particular that the distance between the shaft and the bottom of the sealing element is constant over the entire extension of the bottom of the sealing element in the axial direction A.

For assembling and mounting the shut-off device 1, e.g. to the mounting flange 180 of the agitator 100, the preassembled housing 2 (see FIG. 2 and FIG. 4) is fixed to the mounting flange 180 by the second screws 26.

For preassembling the shut-off device 1 the two half rings 41 are inserted in the constructional unit comprising the first and the second disk 31, 32 and the sealing element 6 bonded to the first and the second disk 31, 32, so that the distance ring 4 consisting of the two half rings 41 is interposed between the first and the second disk 31, 32 and abuts both the first and the second disk 31, 32. After that, the sealing element 6, the first and the second disk 31, 32 together with the distance ring 4 arranged between the first disk 31 and the second disk 32 are inserted into the housing part 21. The O-ring 27 is arranged between the side wall 23 and the cover 24. Then, the cover 24 is fixed to the housing part 21 by the first screws 25.

After the preassembled shut-off device 1 has been fixed and secured to the mounting flange 180 by the second screws 26 both the first disk 31 and the second disk 32 are firmly pressed against the distance ring 4 along the entire circumference of the first and the second disk 31, 32, respectively.

In addition, by tightening the second screws 26 both side walls 61, 62 of the sealing element 6 are clamped. The first side wall 61 of the sealing element 6 is clamped between the first disk 31 and the cover 24 of the housing 2. The second side wall 62 of the sealing element 6 is clamped between the second disk 32 and the bottom 22 of the housing 2.

This design has the additional advantage that the two side walls 61, 62 clamped between the housing 2 and the respective first or second disk 31, 32 function as stationary or static seals for sealing against a leakage of the process fluid in the radial direction. This additional sealing off regarding the radial direction is independent of the state of the shut-off device 1, i.e. both in the activated and in the deactivated state of the shut-off device 1 the two clamped side walls 61, 62 of the sealing element 6 seal off the shaft 120 in radial direction, so that the process fluid cannot leak in radial direction within the shut-off device 1. The static seal realized by the two side walls 61, 62 of the sealing element can even be improved by providing the first and/or the second disk 31, 31 with one or more annular grooves disposed in the respective surface of the first or second disk 31, 31, which faces the respective side wall 61, 62 of the sealing element 6. In addition, the profile of the respective side wall 61, 62 of the sealing element 6 can include annular protrusions designed and arranged for engaging with the grooves in the respective first or second disk 31, 32.

The shut-off device 1 can comprise or can be connectable to a supply unit 8 (FIG. 8) for supplying the fluid to the inlet 5 at the housing 2. The supply unit 8 is arranged outside the housing 2. The fluid is used for switching the shut-off device 1 from the deactivated to the activated state by pressurizing the sealing element 6 so that the sealing element 6 expands in the radial direction, namely radially inwardly. The fluid can be a liquid, for example water, or a gas, for example air, in particular compressed air.

The supply unit 8 comprises a reservoir 81 for the fluid and a supply line 82 connecting the reservoir 81 with the inlet 5 of the shut-off device 1. In addition, the supply unit 8 preferably comprises a drain line 83 for discharging the fluid from the housing 2. The drain line 83 is connectable to the inlet 5. The supply unit 8 can further comprise a switch valve 84, which is designed and arranged to optionally connect the inlet 5 with either the reservoir 81 or the drain line 83. In case the fluid is a liquid, such as water, it can be advantageous to provide a pressure pump 85 in the supply line 82 for pressurizing the liquid.

In particular, if the fluid is a gas, such as compressed air, it can be advantageous to provide a suction pump 86 in the drain line 83 to evacuate the housing 2.

Of course, depending on the fluid that is used for switching the shut-off device 1, it can be advantageous to provide both a pressure pump 85 in the supply line 82 and a suction pump 86 in the drain line 83, or to provide and arrange a pump that can function optionally as a pressure pump 85 or a suction pump 86.

The operation of the shut-off device 1 will now be explained in more detail referring to the embodiment of the agitator 100 with the shut-off device 1 fixed to the mounting flange 180 of the agitator 100, such that the shut-off device 1 is located within the vessel for the process fluid. During operation of the agitator 100 when the shaft 120 is rotating about the axial direction A the shut-off device 1 is in the deactivated state shown in each of FIG. 3 to FIG. 7. The sealing element 6 of the shut-off device 1 is not expanded and the bottom 63 of the sealing element 6 is bent into the space between the first and the second disk 31, 32 (see in particular FIG. 5 and FIG. 7). Thus, a gap is open between the sealing element 6 and the rotating shaft 120, so that the process fluid can flow through the shut-off device 1 in axial direction by passing through that gap. Concurrently, the side walls 61, 62 of the sealing element 6 seal off the shaft 120 with respect to the radial direction, so that the process fluid cannot leak in radial direction within the housing 2 of the shut-off device 1. The shaft is freely rotating within the central passage 3 of the shut-off device 1 without contacting the sealing element 6 or any other component of the shut-off device 1.

When the agitator 100 is at standstill the shaft 120 is not rotating but stationary. Now the shut-off device 1 can be switched to the activated state. For that purpose the fluid, e.g. water or compressed air, is supplied from the reservoir 81 through the supply line 82 and the inlet 5 to the annular chamber 7. The fluid passes through the holes 42 in the distance ring 4 and pressurizes the sealing element 6 and in particular the bottom 63 of the sealing element 6 as indicated by the arrow P in FIG. 7. Since the side walls 61, 62 are completely clamped between the housing 2 and the respective first or second disk 31, 32 up to the radially inner end of the respective side wall 61,62 the sealing element 6 expands only in one direction, namely radially inwardly towards the shaft 120 as indicated by the arrow E in FIG. 7. By this expansion, the bottom 63 of the sealing element 6 is pressed against the shaft 120 and sealingly abuts the shaft 120. The shut-off device 1 is now in the activated state illustrated in FIG. 8. The gap between the sealing element 6 and the shaft 120 is closed and the bottom 63 of the sealing element 6 seals off the shaft 120 with respect to the axial direction A. Concurrently, the side walls 61, 62 of the sealing element 6 seal off the shaft 120 with respect to the radial direction. Thus, the process fluid can neither leak in axial direction A nor in radial direction perpendicular to the shaft 120.

When the shut-off device 1 is in the activated state it is possible to remove or to open for example the sealing unit 190 of the agitator 100 without emptying the vessel containing the process fluid.

For switching the shut-off device 1 from the activated state to the deactivated state the sealing element 6 is depressurized. For that purpose the inlet 5 is connected to the drain line 83, so that the pressurized fluid can flow from the housing 2 through the inlet 5 into the drain line 83, thus releasing the pressure acting on the sealing element 6. Due to its elasticity the sealing element 6 returns to the shape and the location, which it has in the deactivated state of the shut-off device 1. As an option the switching from the activated to the deactivated state of the shut-off device 1 can be supported by the suction pump 86 sucking the fluid off the housing 2.

As already explained above, a considerable advantage of the shut-off device 1 is the fact that the sealing element 6 expands—at least essentially—only in one direction, when switching the shut-off device 1 from the deactivated to the activated state. Therefore, the gap between the sealing element 6 and the shaft 120, which is open in the deactivated state of the shut-off device 1, can be designed to be considerably larger regarding the radial direction than in known devices. This larger gap results in a higher flowrate of the process fluid through the gap when the shut-off device is in the deactivated state.

In addition, since the sealing element 6 is clamped between the housing 2 and the first and the second disk 31, 32, respectively, any particles or solid constituents that might be contained in the process fluid cannot enter between the sealing element 6 and the housing 2.

Figure 9:
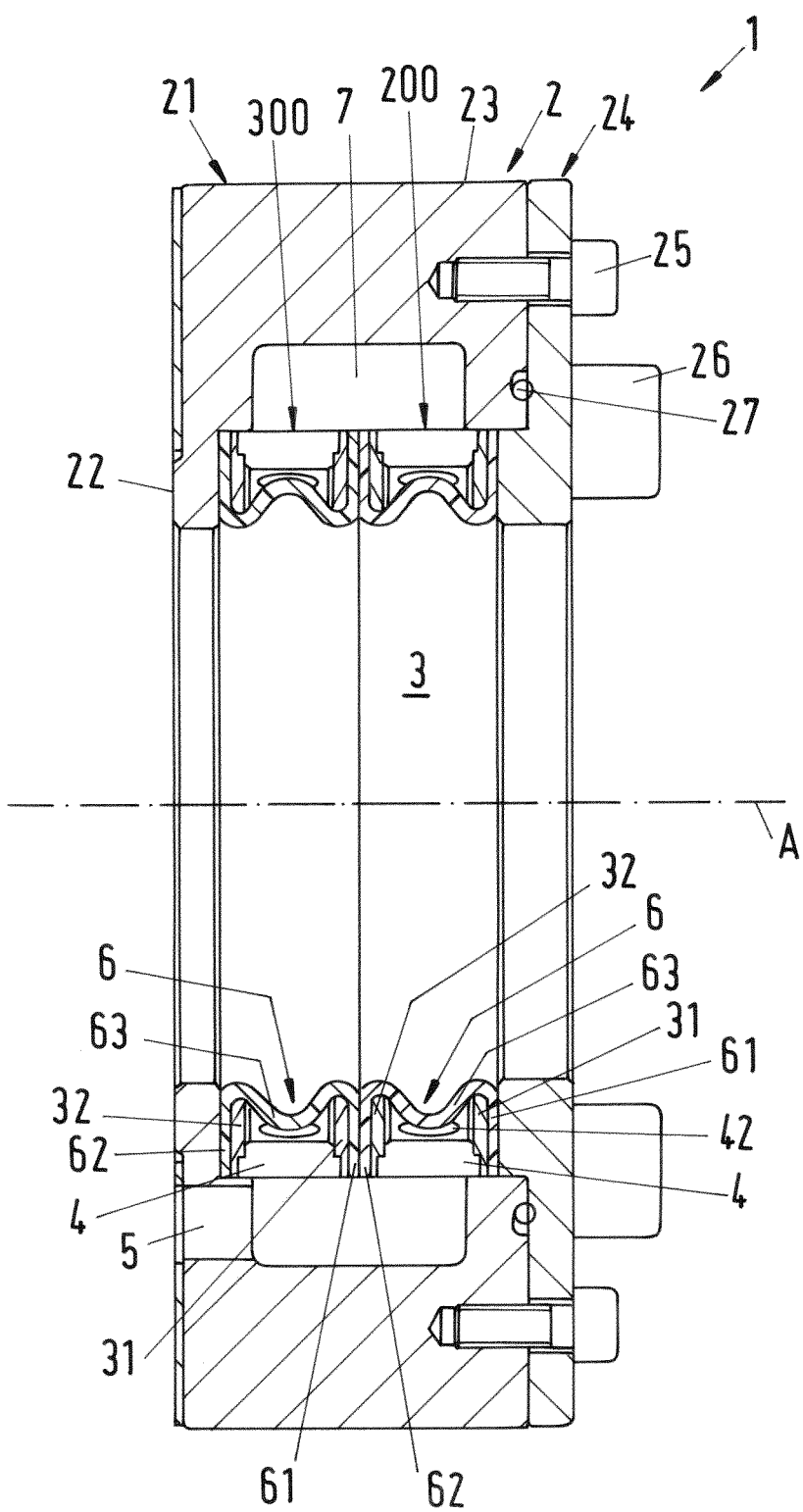
FIG. 9 is a cross-sectional view of a second embodiment of the shut-off device according to the invention.

FIG. 9 shows a cross-sectional view of a second embodiment of the shut-off device 1 according to the invention. In the following description of the second embodiment of the shut-off device 1 only the differences to the first embodiment are explained in more detail. The explanations with respect to the first embodiment are also valid in the same way or in analogously the same way for the second embodiment. Same reference numerals designate the same features that have been explained with reference to the first embodiment or functionally equivalent features.

The second embodiment of the shut-off device comprises at least two sealing parts 200, 300, namely a first sealing part 200 and a last sealing part 300. Each sealing part 200, 300 comprises at least the expandable annular sealing element 6 as it has been described with respect to the first embodiment and the first disk 31 and the second disk 32 as they have been explained with respect to the first embodiment. Preferably each of the sealing parts 200, 300 also comprises a distance ring 4 having the plurality of holes 42.

In the second embodiment shown in FIG. 9 there are exactly two sealing parts 200, 300, which are arranged adjacent to each other with respect to the axial direction A. The two sealing parts 200 and 300 are arranged in series such that the second side wall 62 of the sealing element 6 of the first sealing part 200 abuts against the first side wall 61 of the sealing element 6 of the last sealing part 300. In other embodiments there might be more than two sealing parts, so that at least one additional sealing part is arranged between the first sealing part 200 and the last sealing part 300.

The first embodiment of the shut-off device can be considered as having only one of the sealing parts of the second embodiment.

In the second embodiment of the shut-off device 1, the annular chamber 7 is configured such that the annular chamber 7 is delimited radially inwardly by both the distance ring 4 of the first sealing part 200 and the distance ring 4 of the last sealing part 300, wherein the holes 42 in the distance rings 4 allow for a flow of the fluid through both of the distance rings 4.

For preassembling the second embodiment of the shut-off device 1 for each sealing unit 200, 300 the two half rings 41 of the respective distance ring 4 are inserted in the constructional unit comprising the first and the second disk 31, 32 and the sealing element 6 bonded to the first and the second disk 31, 32, so that the distance ring 4 is interposed between the first and the second disk 31, 32 and abuts both the first and the second disk 31, 32. After that, all sealing units 200, 300 are arranged side by side in the housing part 21, so that the second side wall 62 and the first side wall 61 of two sealing elements 6 of adjacent sealing parts 200, 300 are abutting each other. The O-ring 27 is arranged between the side wall 23 and the cover 24. Then, the cover 24 is fixed to the housing part 21 by the first screws 25.

After the preassembled shut-off device 1 has been fixed and secured to the mounting flange 180 by the second screws 26, for each sealing part 200, 300 both the first disk 31 and the second disk 32 are firmly pressed against the distance ring 4 of the respective sealing part 200, 300 along the entire circumference of the first and the second disk 31, 32, respectively.

In addition, by tightening the second screws 26 the first side wall 61 of the sealing element 6 of the first sealing part 200 is clamped between the housing 2, more precisely between the cover 24 of the housing 2 and the first disk 31 of the first sealing part 200, and the second side wall 62 of the sealing element 6 of the last sealing part 300 is clamped between the housing 2, more precisely between the bottom 22 of the housing 2, and the second disk 32 of the last sealing part 300. Furthermore, the second side wall 62 of the sealing element 6 of the first sealing part 200 and the first side wall 61 of the sealing element 6 of the last sealing part 300 are clamped between the second disk 32 of the first sealing part 200 on the one side and the first disk 31 of the last sealing part 300 on the other side.

The invention claimed is:

1. A shut-off device for sealing a shaft of a rotary machine at standstill, the shut-off device having an activated state for sealing the shaft and a deactivated state for free rotation of the shaft within the shut-off device, the shut-off device comprising:
   a housing;
   a central passage extending in an axial direction and configured to surround the shaft;
   a ring-shaped first disk;
   a ring-shaped second disk arranged in the housing and parallel with and spaced apart from the ring-shaped first disk in the axial direction; and
   an expandable annular sealing element having a first side wall, a second side wall and an elastic bottom, the first side wall and the second side wall each extending in a radial direction, and the bottom connecting a radially inner end of the first side wall with a radially inner end of the second side wall, and the housing comprising an inlet for a fluid to expand the sealing element, the first side wall of the sealing element arranged and clamped between the housing and the first disk and the second side wall of the sealing element arranged and clamped between the housing and the second disk.

2. The shut-off device in accordance with claim 1, wherein the annular sealing element includes an elastomer.

3. The shut-off device in accordance with claim 1, wherein the sealing element is bonded both to the first disk and to the second disk.

4. The shut-off device in accordance with claim 1, wherein both the first disk and the second disk are metallic disks.

5. The shut-off device in accordance with claim 1, wherein the elastic bottom of the annular sealing element has in the deactivated state a width larger than a distance between the first side wall and the second side wall of the sealing element.

6. The shut-off device in accordance with claim 1, wherein the elastic bottom of the annular sealing element has in the deactivated state an essentially V-shaped cross-section.

7. The shut-off device in accordance with claim 1, wherein a distance ring is arranged between the first disk and the second disk, the distance ring abutting the first disk and the second disk.

8. The shut-off device in accordance with claim 7, wherein the distance ring comprises a plurality of holes arranged along a circumference of the distance ring for delivering the fluid to the sealing element.

9. The shut-off device in accordance with claim 7, comprising an annular chamber surrounding the distance ring, wherein the annular chamber in fluid communication with the inlet for the fluid.

10. The shut-off device in accordance with claim 1, comprising a supply unit configured to supply the fluid, the supply unit arranged outside the housing and in fluid communication with the inlet of the housing.

11. The shut-off device in accordance with claim 10, wherein the supply unit is configured to selectively supply the fluid to the housing and discharge the fluid from the housing.

12. A shut-off device for sealing a shaft of a rotary machine at standstill, the shut-off device having an activated state for sealing the shaft and a deactivated state for a free rotation of the shaft within the shut-off device, the shut-off device comprising:
   a housing;
   a central passage extending in an axial direction and configured to surround the shaft; and
   at least two sealing parts, the at least two sealing parts including a first sealing part and a last sealing part, each sealing part comprising
   a ring-shaped first disk and a ring-shaped second disk arranged in the housing in parallel with each other and spaced apart from each other regarding the axial direction, and
   an expandable annular sealing element having a first side wall, a second side wall and an elastic bottom,
   each of the first side walls and each of the second side walls extend in a radial direction, and each of the bottoms connect a radially inner end of a respective first side wall with a radially inner end of a respective second side wall, the housing comprising an inlet for a fluid configured to expand each of the sealing elements, the first side wall of the sealing element of the first sealing part arranged and clamped between the housing and the first disk of the first sealing part, and the second side wall of the sealing element of the last sealing part arranged and clamped between the housing and the second disk of the last sealing part.

13. A rotary machine for acting on a process fluid, comprising:
   an impeller configured to act on the process fluid;
   the shaft on which the impeller is mounted;
   a drive unit operatively connected to the shaft configured to rotate the shaft and the impeller;
   a sealing unit configured to seal the shaft during rotation of the shaft; and
   a shut-off device according to claim 1 and arranged adjacent to the sealing unit.

14. The rotary machine in accordance with claim 13, wherein the rotary machine if an agitator configured to mix or agitate a process fluid.

15. The rotary machine in accordance with claim 14, further comprising a mounting flange configured to fasten the rotary machine to a wall of a vessel for the process fluid, the shut-off device fixed to the mounting flange.

* * * * *